United States Patent [19]

Fry et al.

[11] Patent Number: 5,127,955
[45] Date of Patent: Jul. 7, 1992

[54] CHLORIDE-FREE SET ACCELERATED CEMENT COMPOSITIONS AND METHODS

[75] Inventors: Slaton E. Fry, Batesville, Ark.; Patty L. Totten; Jerry D. Childs, both of Duncan, Okla.; Donald W. Lindsey, Marlow, Okla.

[73] Assignee: Halliburton Company, Duncan, Okla.

[21] Appl. No.: 600,055

[22] Filed: Oct. 17, 1990

[51] Int. Cl.⁵ .............................................. C04B 22/00
[52] U.S. Cl. .................................. 106/819; 106/725; 106/728; 106/810; 106/823; 166/292; 166/293
[58] Field of Search ............... 106/725, 810, 724, 806, 106/728, 683, 686, 638, 819, 820, 823; 523/130; 524/2; 166/293, 292

[56] References Cited

U.S. PATENT DOCUMENTS

| | | | |
|---|---|---|---|
| 4,238,236 | 12/1980 | Falcoz et al. | 106/725 |
| 4,742,094 | 5/1988 | Brothers et al. | 524/2 |
| 4,967,839 | 11/1990 | Carpenter et al. | 106/665 |

Primary Examiner—William R. Dixon, Jr.
Assistant Examiner—Paul Marcantoni
Attorney, Agent, or Firm—Thomas R. Weaver

[57] ABSTRACT

Chloride-free set accelerated cement compositions and methods of using the compositions for cementing conduits in well bores are provided. The compositions are comprised of hydraulic cement, sufficient water to form a pumpable slurry and a chloride-free set accelerator selected from trihydroxybenzoic acid, disodium dihydroxybenzenedisulfonate or derivatives of such compounds.

9 Claims, 2 Drawing Sheets

CHLORIDE-FREE SET ACCELERATED CEMENT COMPOSITIONS AND METHODS

BACKGROUND OF THE INVENTION

1. Field of the Invention

The present invention relates to chloride-free set accelerated cement compositions and methods of using the compositions in oil and gas well cementing operations.

2. Description of the Prior Art

In the primary cementing of oil and gas wells, a hydraulic cement composition is pumped down the well bore penetrating a subterranean formation through a conduit disposed in the well bore and back up through the annulus between the conduit and the well bore. Upon setting, the cement composition bonds to the conduit and to the sides of the well bore whereby the conduit is supported within the well bore and fluid movement between subterranean formations penetrated by the well bore is prevented. To be useful as a well cementing composition, the composition, among other things, must retain its pumpability for a sufficient period of time, have a low viscosity while being pumped, resist fluid loss into subterranean formations and, after placement, rapidly thicken, set and develop strength.

In a number of primary cementing applications it is necessary to include a set accelerator in the cement compositions as a result of the set time retardation caused by low temperatures and the use of fluid loss reducing additives, dispersants, salts and the like. For example, high alkali metal or alkaline earth metal salt concentrations are often utilized in cement composition used in primary cementing applications. The salt functions as a dispersant in the cement composition, and can cause the composition to expand upon setting whereby the attainment of a good bond between the walls of the well bore and the conduit being cemented therein is enhanced. In addition, the use of a high salt concentration cement composition contributes to preventing the swelling of clays which are contacted by the composition and the sloughing of salt-containing shales which in turn prevents problems such as bridging and lost circulation. In applications where high salt concentration cement compositions are used, i.e., concentrations of from about 18% by weight of water to saturation, and the temperatures to which the compositions are exposed when setting are relatively low, the cement composition set times can be excessive. The use of conventional fluid loss reducing additives in combination with high salt concentrations can extend the set times of cement compositions even longer.

While a variety of set time accelerator additives have been developed and used heretofore, a number of such additives have been comprised of one or more chlorides. Such chloride-containing set accelerators in cement compositions can cause corrosion of the metal casing and liners in contact therewith, can reduce the sulfate stability of the cement and bring about other adverse results.

In one application of the present invention, chloride-free set time accelerators, chloride-free cement compositions containing such accelerators and methods of using the compositions in oil and gas well cementing operations are provided. In another application of the present invention, chloride-free set time accelerators are employed to negate the retarding effects of high concentrations of salt or other cementing additives.

SUMMARY OF THE INVENTION

Set accelerated cement compositions are provided comprised of hydraulic cement, sufficient water to form a pumpable slurry, and a chloride-free set accelerator selected from the group consisting of trihydroxybenzoic acid and derivatives thereof and disodium dihydroxybenzenedisulfonate and derivatives thereof. The chloride-free set accelerator is preferably present in the compositions in an amount in the range of from about 0.1% to about 5.0% by weight of dry cement therein. Also, the cement compositions may contain silica flour and a fluid loss reducing additive.

Methods of using the cement compositions for cementing oil and gas wells are also provided which generally comprise the steps of introducing a chloride-free set accelerated cement composition into the annulus between a conduit disposed in a well bore and the walls of the well bore, and allowing the composition to set therein.

It is, therefore, a general object of the present invention to provide set accelerated cement compositions and methods of using the compositions. Other and further objects, features and advantages of the invention will be readily apparent to those skilled in the art upon a reading of the description of preferred embodiments which follows when taken in conjunction with the accompanying drawings.

DESCRIPTION OF PREFERRED EMBODIMENTS

Figure 1:
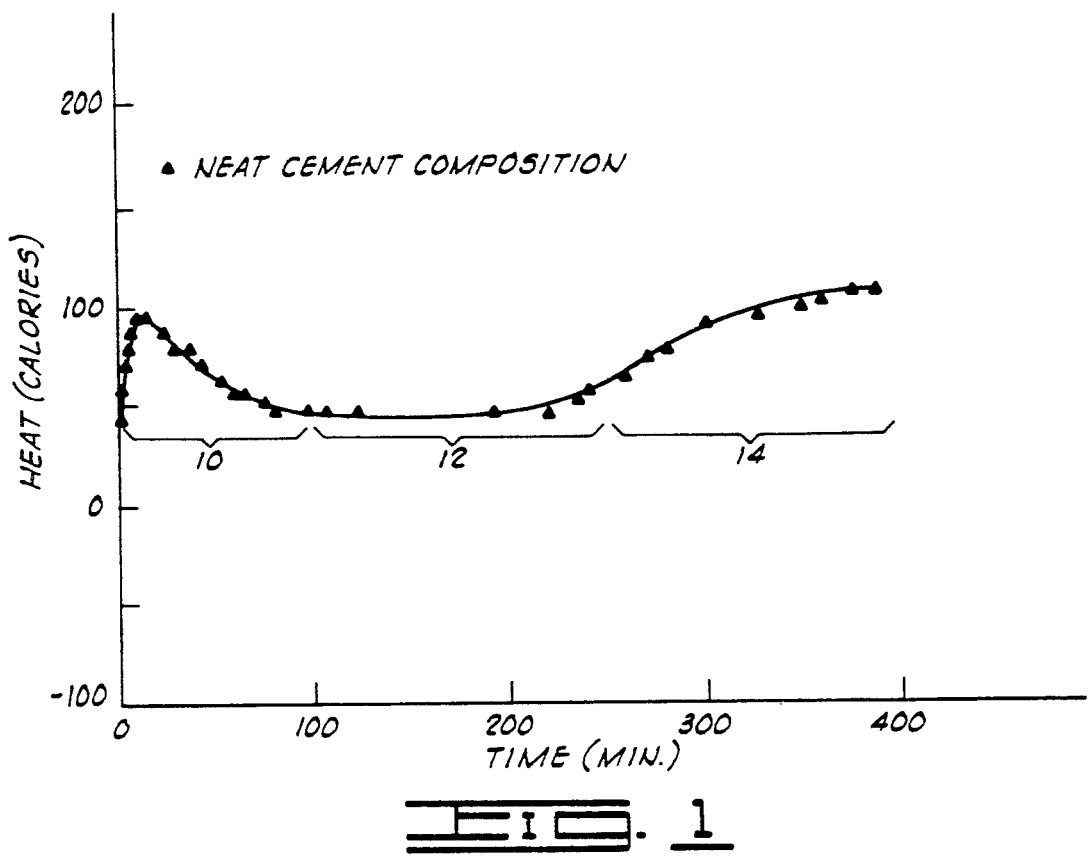
FIG. 1 is a graph of calorimetric data from the hydration of a Class H Portland cement mixed with distilled water.

The set accelerated cement compositions of the present invention are comprised of hydraulic cement, water present in an amount sufficient to form a pumpable slurry and a chloride-free set accelerator comprised of trihydroxybenzoic acid, disodium dihydroxybenzenedisulfonate or derivatives of the foregoing compounds.

The cement composition of this invention may also include silica flour to prevent cement strength deterioration and a fluid loss reducing additive. The compositions have set times of sufficient duration to allow their placement in zones to be cemented, but once placed, the compositions rapidly thicken and set into hard masses having required strengths and other characteristics.

While various hydraulic cements can be utilized in forming the compositions of this invention, Portland cement of the various types identified as API Classes A through H and J are preferred. Such cements are identified and defined in *API Specification for Materials and Testing for Well Cements*, API Specification 10, Third Edition, Jul. 1, 1986, of the American Petroleum Institute which is incorporated herein by reference. Most preferably, the compositions of the present invention are comprised of API Class H Portland cement.

The water in the cement compositions can be fresh water, water having a high salt concentration, brine or sea water. The term "water having a high salt concentration" means water having dissolved therein one or more alkali or alkaline earth metal salts in an amount of from about 18% by weight of the water to saturation of the water. The high concentration of salt in the water, if desired, can be achieved by the addition of the salt thereto either before or during mixing with the hydraulic cement used.

The chloride-free set accelerator used for forming the cement compositions of this invention is selected from the group consisting of trihydroxybenzoic acid, e.g., 2,4,6-trihydroxybenzoic acid, and derivatives thereof and disodium dihydroxybenzenedisulfonate, e.g., disodium 4,5-dihydroxy-m-benzenedisulfonate, and derivatives thereof.

Various derivatives of disodium dihydroxybenzenedisulfonate can be prepared and used whereby the set accelerating reaction of the basic disodium dihydroxybenzenedisulfonate compound is delayed. For example, disodium dihydroxybenzenedisulfonate can be reacted with an organic salt to esterify one or both of the hydroxy groups attached to the benzene ring. When the ester derivative is combined with water in the cement composition, the time required for the hydrolysis of the ester groups brings about a delay in the set time acceleration brought about by the basic disodium dihydroxybenzenedisulfonate compound. Other derivatives can be produced by reacting the disodium dihydroxybenzenedisulfonate compound with phosphoric acid, sulfuric acid, phosphorous and sulfurous halides, alcohols or amines. Acetal and ketal derivatives can be prepared by reacting the basic compound with aldehydes or ketones.

The trihydroxybenzoic acid compound can be derivatized with a wide variety of acylhalide or alcohols to produce carboxylate esters. Phosphoric and sulfuric acids and salts thereof can also be utilized as described above. Trihydroxybenzoic acid is a weak accelerator, i.e., it requires a longer time to bring about set time acceleration. As a result, in many applications it can be used directly without the time delay brought about by derivatives of the type described above.

The chloride-free set accelerators selected from the group consisting of trihydroxybenzoic acid, disodium dihydroxybenzenedisulfonate and derivatives of the foregoing compounds are generally utilized in the cement compositions of this invention in amounts in the range of from about 0.1% to about 5.0% by weight of dry cement used in the compositions. When disodium dihydroxybenzenedisulfonate or its derivatives are utilized, they are preferably present in the cement composition in an amount in the range of from about 0.1% to about 5.0% by weight of dry cement therein. When trihydroxybenzoic acid or its derivatives are utilized, they are preferably present in the cement compositions in an amount in the range of from about 0.1% to about 5.0% by weight of dry cement therein.

As is well understood by those skilled in the art, the selection of one of the particular compounds or derivatives thereof described above depends on the depth of the well bore to be cemented, the time required for placing a cement composition in a desired location within the well bore, the temperatures to be encountered, other additives included in the cement composition and various other factors well known to those skilled in the art.

The cement compositions of this invention may also include silica flour to prevent cement strength deterioration. The silica flour is preferably added to the cement compositions in amounts in the range of from about 25% to about 70% by weight of dry cement therein.

A fluid loss reducing additive is also preferably included in the cement compositions so that the compositions have low water loss to permeable formations contacted during and after placement in a zone to be cemented. While various known cement composition fluid loss reducing additives can be utilized, a preferred such additive is the complex comprised of the reaction product of polyethyleneimine and one or more sulfonated organic compounds described in U.S. Pat. No. 4,742,094 issued May 3, 1988 which is incorporated herein by reference. The polyethyleneiminesulfonated organic compound fluid loss reducing complex is particularly effective in reducing water loss in high salt concentration cement compositions. The fluid loss reducing additive is combined with the chloride-free set accelerated cement compositions of this invention in the general amount in the range of from about 0.1% to about 5.0% by weight of dry cement therein. When the above described polyethyleneimine-sulfonated organic compound complex is utilized, it is preferably added to the cement composition in an amount in the range of from about 5% to about 20% by weight of dry cement therein.

In using a set accelerated cement composition of this invention for the primary cementing of an oil or gas well, the thickening and set times and other properties of the cement composition to be used are first determined using techniques well known to those skilled in the art based on the factors mentioned above. Test cement compositions containing various additives are then prepared and tested to determine the required types and quantities of the additives, particularly the type and quantity of the chloride-free set accelerator additive, whereby the needed set time and other cement composition properties are obtained. The particular cement composition to be used is then prepared and introduced into the annulus between the walls of the well bore and a conduit disposed therein. Generally, a steel casing and/or liner is disposed in the well bore which extends from the surface to the formation or formations from which hydrocarbons are to be produced. In order to bond and support the casing and/or liner in the well bore and to prevent communication between producing and nonproducing formations by way of the annulus between the outside of the casing and the well bore, the cement composition is pumped downwardly within the casing or liner to the bottom end thereof and then upwardly in the annulus. After placement in the annulus, the cement composition is allowed to set into a hard mass whereby the casing or liner is sealingly bonded to the walls of the well bore.

In order to further illustrate the present invention and to facilitate a clear understanding of the compositions and methods thereof, the following examples are given.

Example I

Portland cement evolves a large quantity of heat during the hydration process. Typically, a Portland cement composition will exhibit three distinct regions when the amount of heat given off is plotted as a function of time. For example, FIG. 1 is a graph of calorimetric data from the hydration of a Portland Class H cement mixed with distilled water, i.e., a slurry containing 4.3 gallons of water per sack of cement having a weight of 16.4 lbs. per gallon. As shown in FIG. 1, the first region 10 is exothermic and represents the heat of solution of various inorganic materials and the hydration of fast reacting phases, e.g., tricalcium aluminate. The second region 12 is often referred to as the "dormant region", and is characterized by little or no heat evolution. The last region 14 represents the hydration of tricalcium silicate, and is characterized by a large exothermic peak. Most set time accelerators simply shorten the length of the dormant period, as do those of the present invention.

The following procedure was utilized in obtaining the data set forth in FIG. 1. A neat cement composition was prepared by weighing 100 grams of Trinity Lafarge API Class H cement into a calorimeter. In a separate container, 38 grams of distilled water was weighed, and then added to the cement in the calorixeter. The mixture was stirred for 30 seconds. The resulting mixture contained the equivalent of 4.3 gallons of water per sack of cement and had a density of 16.4 pounds/gallon. The initial temperature of the water was measured prior to its addition, and the first reading was taken one minute after the addition of the water and stirring. Temperature readings were then taken at various time intervals until the cement exhibited enough compressive strength whereby it could not easily be depressed by touch, or until approximately 9 hours had elapsed. The heat evolved was calculated using conventional equations and the following heat capacities:

| Compound | Heat Capacity, Cal./°C |
|---|---|
| Salt (NaCl) | 0.21 |
| Portland cement | 0.20 |
| Distilled water | 1.0 |

The heat capacity of the calorimeter was determined to be 4.4 Cal./° C.

EXAMPLE II

The procedure of Example I was repeated except that 2,4,6-trihydroxybenzoic acid was included in the cement composition in an amount of 2% by weight of dry cement used. The calorimetric data resulting from the tests is shown in FIG. 2.

Figure 2:
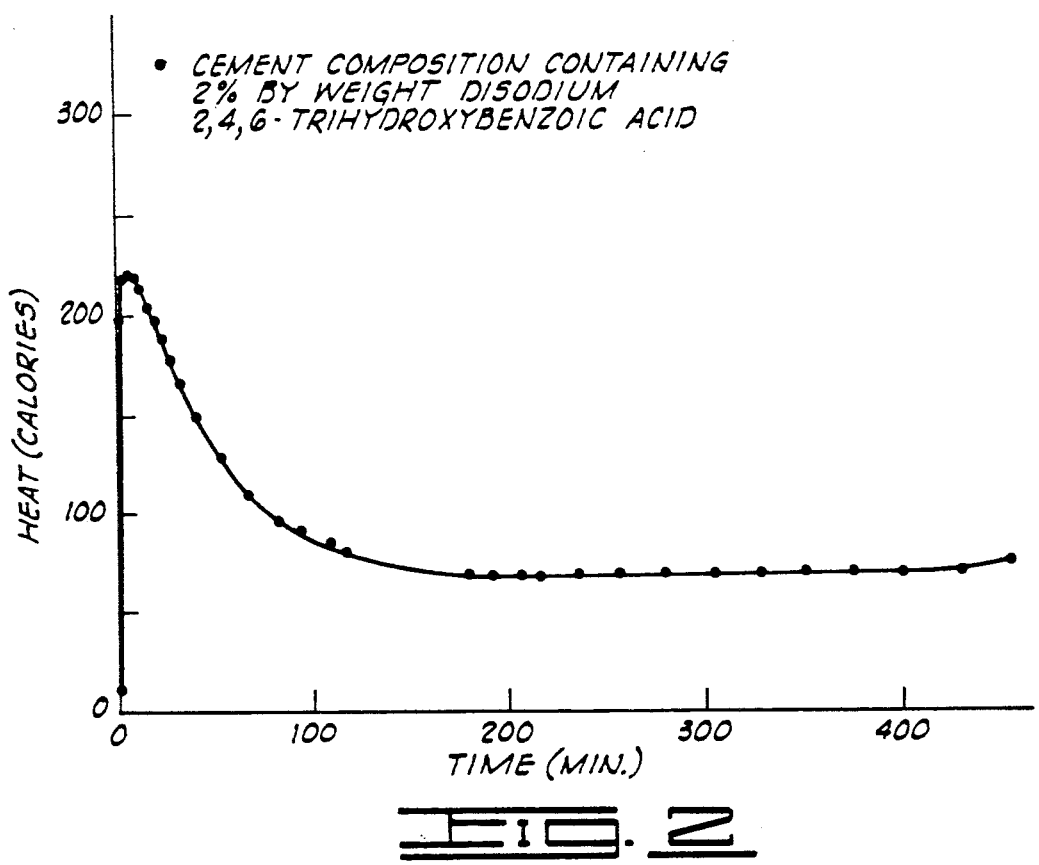
FIG. 2 is a graph of calorimetric data from the hydration of a Class H Portland cement mixed with distilled water and containing 2,4,6-trihydroxybenzoic acid set accelerator.

A comparison of FIGS. 1 and 2 shows that the 2,4,6-trihydroxybenzoic acid caused the dormant region to be eliminated and the set time to be accelerated.

EXAMPLE III

Figure 3:
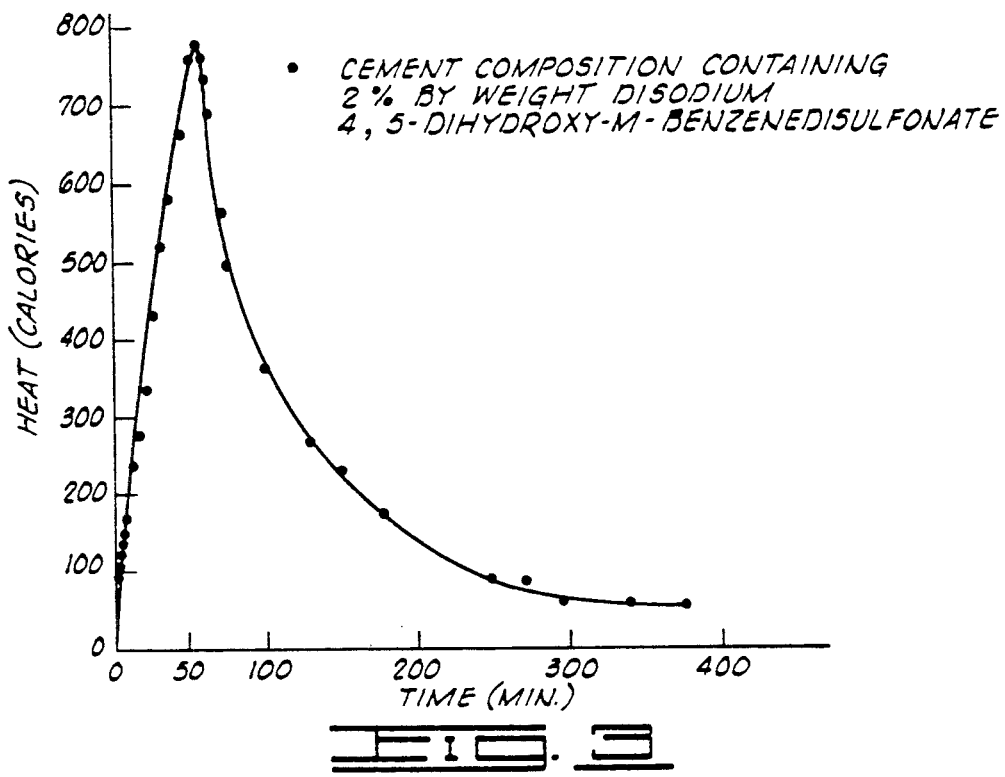
FIG. 3 is a graph of calorimetric data from the hydration of a Class H Portland cement mixed with distilled water and containing disodium 4,5-dihydroxy-m-benzenedisulfonate set accelerator.

The procedure of Example II was repeated except that disodium 4,5-dihydroxy-m-benzenedisulfonate was substituted for the 2,4,6-trihydroxybenzoic acid. The resulting calorimetric data is set forth in FIG. 3. From FIG. 3 it can be seen that the dormant period was again eliminated.

EXAMPLE IV

The procedure of Example I was repeated except that in a first test, the distilled water was saturated with sodium chloride, i.e., the water contained 37.2% by weight sodium chloride (sodium chloride was used for convenience reasons only). In a second test, the same saturated sodium chloride cement composition was prepared, and in addition, disodium-4,5-dihydroxy-m-benzenedisulfonate was included in the composition in an amount of 2% by weight of dry cement used. The calorimetric data from these two tests is shown in FIG. 4.

Figure 4:
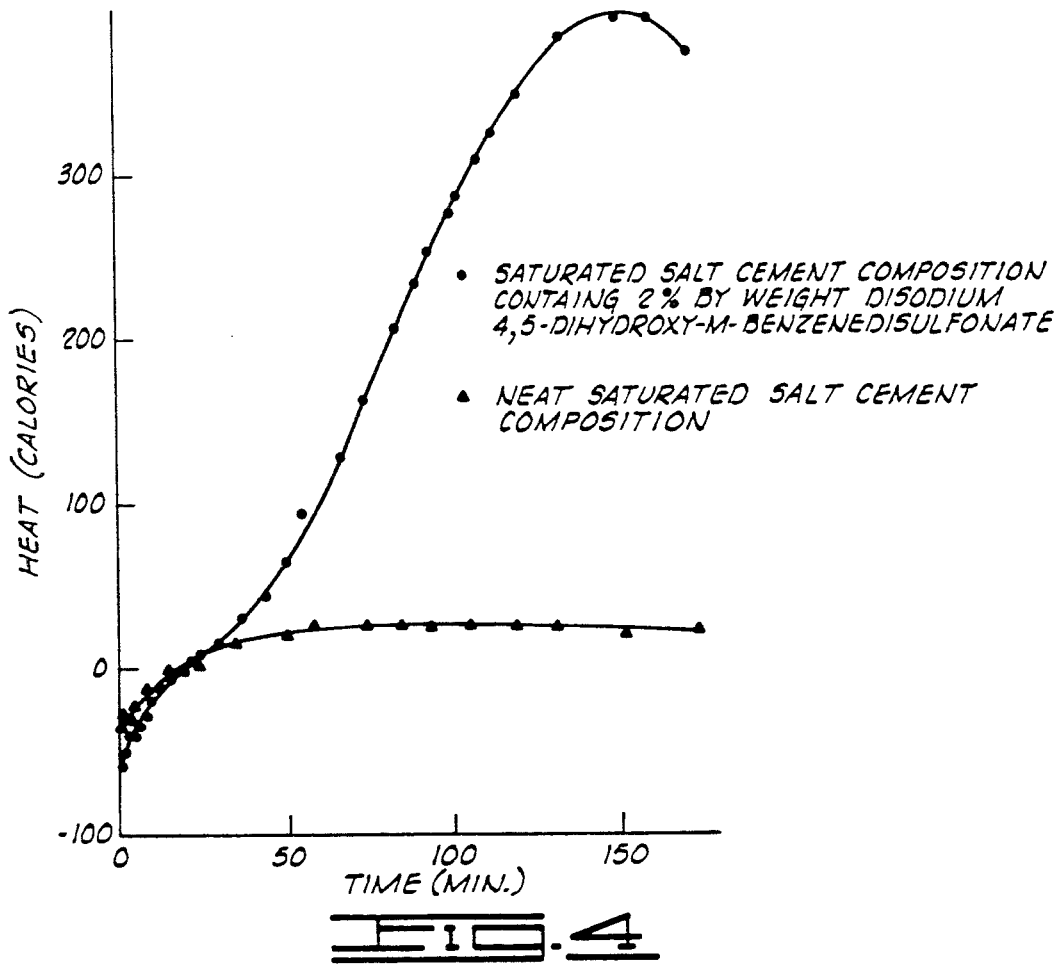
FIG. 4 is a graph of calorimetric data from the hydration of a Class H Portland cement mixed with salt saturated water, and the hydration of a Class H Portland cement mixed with salt saturated water and containing disodium 4,5-di-hydroxy-m-benzenedisulfonate set accelerator.

As can clearly be seen from FIG. 4, the presence of the chloride-free set accelerator, i.e., disodium-4,5-dihydroxy-m-benzenedisulfonate, in the saturated salt cement composition shortened the dormant region and caused a significant reduction in the set time.

Thus the present invention is well adapted to carry out the objects and obtain the ends and advantages mentioned as well as those inherent therein. From the foregoing description, one skilled in the art can easily ascertain the essential characteristics of this invention and can make various changes and modifications to adapt the invention to various usages and conditions without departing from the spirit and scope of the invention as defined in the appended claims.

What is claimed is:

1. A method of cementing a conduit in a well bore penetrating a subterranean formation comprising:
    introducing a cement composition into the space between said conduit and the walls of said well bore, said cement composition consisting essentially of hydraulic cement, water and a set tine accelerator; wherein
    said hydraulic cement is a Portland cement selected from American Petroleum Institute (API) Classes A through H and J;
    said water is present in said composition in an amount in the range of from about 38 to about 56 pounds of water per 100 pounds of said cement; and
    said set time accelerator is present in said composition in an amount in the range of from about 0.1 to about 5.0 percent by weight of said hydraulic cement, is chloride-free and is selected from the group consisting of trihydroxybenzoic; disodium dihydroxy-benzenedisulfonate; reaction products of said disodium dihydroxy-benzenedisulfonate and compounds selected from the group consisting of organic salts, aldehydes and ketones; and reaction products of said trihydroxybenzoic acid and compounds selected from the group consisting of acylhalides and acyl alcohols; and
    allowing said cement composition to set into a hard mass.

2. The method of claim 1 wherein said water is: fresh water; water having dissolved therein one or more alkali or alkaline earth metal salts in an amount of from about 18% by weight of the water to saturation of the water; brine; or sea water.

3. The method of claim 1 wherein said set accelerator is trihydroxybenzoic acid or reaction products of said trihydroxybenzoic acid and compounds selected from the group consisting of acylhalides and acyl alcohols and is present in said composition in an amount in the range of from about 0.1% to about 5.0% by weight of dry cement therein.

4. The method of claim 1 wherein said set accelerator is disodium dihydroxybenzenedisulfonate or reaction products of said disodium dihydroxy-benzenedisulfonate and compounds selected from the group consisting of organic salts, aldehydes and ketones and is present in said composition in an amount in the range of from about 0.1% to about 5.0% by weight of dry cement therein.

5. The method of claim 1 wherein said cement composition is further characterized to include silica flour present in an amount in the range of from about 25% to about 70% by weight of dry cement therein.

6. The method of claim 1 wherein said cement composition is further characterized to include a fluid loss reducing additive therein.

7. The method of claim 6 wherein said fluid loss reducing additive is a polyethyleneimine-sulfonated organic compound complex.

8. The method of claim 7 wherein said fluid loss reducing additive is present in said cement composition in an amount in the range of from about 5% to about 20% by weight of dry cement therein.

9. The method of claim 8 wherein said cement composition further includes silica flour present in an amount in the range of from about 25% to about 70% by weight of dry cement therein.

* * * * *